(12) United States Patent
Motonaga

(10) Patent No.: US 9,794,502 B2
(45) Date of Patent: Oct. 17, 2017

(54) IMAGE CAPTURING APPARATUS

(71) Applicant: CANON KABUSHIKI KAISHA, Tokyo (JP)

(72) Inventor: Yusaku Motonaga, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 63 days.

(21) Appl. No.: 15/014,379

(22) Filed: Feb. 3, 2016

(65) Prior Publication Data
US 2016/0234448 A1 Aug. 11, 2016

(30) Foreign Application Priority Data

Feb. 5, 2015 (JP) .................................. 2015-021491

(51) Int. Cl.
*H04N 5/367* (2011.01)
*H04N 5/361* (2011.01)

(52) U.S. Cl.
CPC ............ *H04N 5/367* (2013.01); *H04N 5/361* (2013.01)

(58) Field of Classification Search
CPC ........ H04N 5/361; H04N 5/367; H04N 5/369; H01L 27/14607
USPC ................................................ 348/246, 315
See application file for complete search history.

(56) References Cited

U.S. PATENT DOCUMENTS

| 2011/0267498 | A1* | 11/2011 | Kaibara | ................. | H04N 5/367 348/231.99 |
| 2012/0217606 | A1* | 8/2012 | Itonaga | .................. | H04N 5/369 257/443 |
| 2012/0261551 | A1* | 10/2012 | Rogers | ..................... | G02B 3/14 250/208.1 |
| 2014/0049683 | A1* | 2/2014 | Guenter | ............... | H04N 5/3696 348/360 |
| 2016/0086987 | A1* | 3/2016 | McKnight | ......... | H01L 27/14607 257/432 |
| 2016/0086994 | A1* | 3/2016 | Guenter | ............... | H04N 5/3696 250/206 |

FOREIGN PATENT DOCUMENTS

JP 08-018873 A 1/1996
JP 4604307 B 1/2011

* cited by examiner

*Primary Examiner* — Nhan T Tran
(74) *Attorney, Agent, or Firm* — Cowan, Liebowitz & Latman, P.C.

(57) ABSTRACT

An image capturing apparatus comprises an image sensor in which a plurality of pixels are arranged two-dimensionally, and a control unit configured to control a band gap of the pixels of the image sensor, wherein the control unit, in a case where defective pixel detection processing is performed on the image sensor, controls the band gap so as to be smaller than in a case where normal image capture is performed.

19 Claims, 8 Drawing Sheets

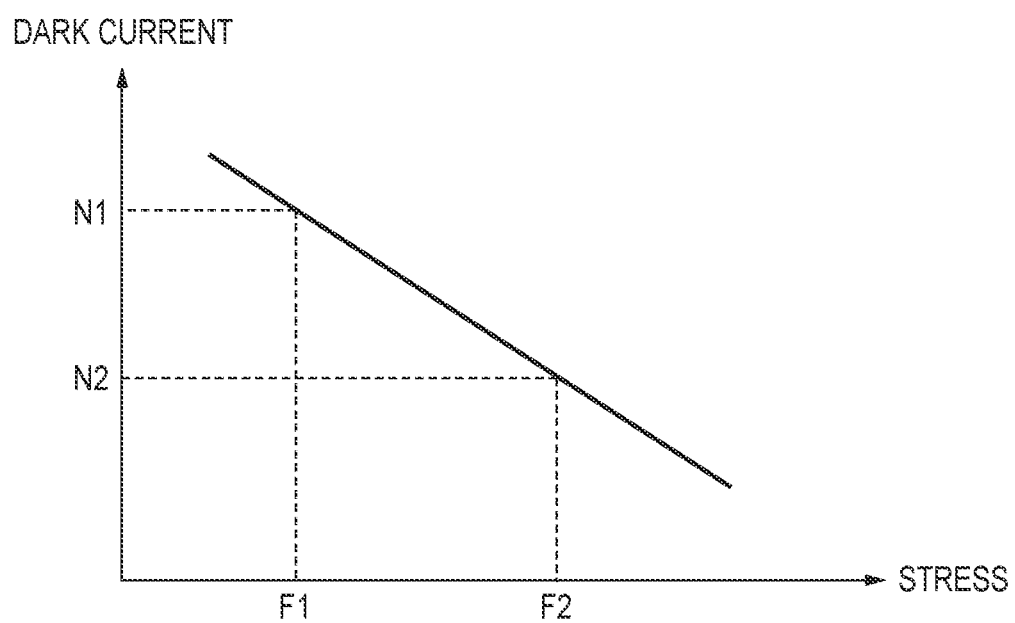

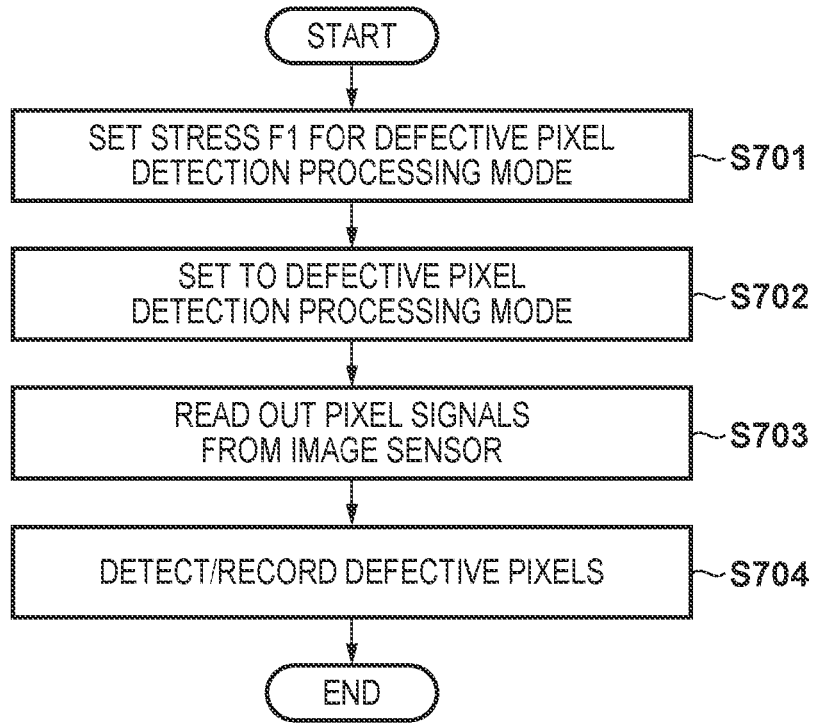
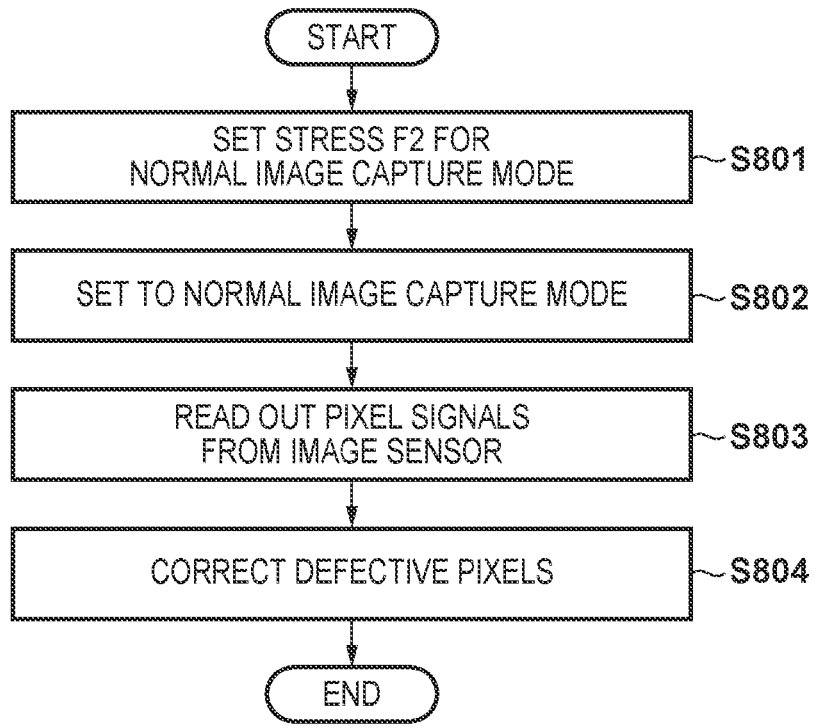

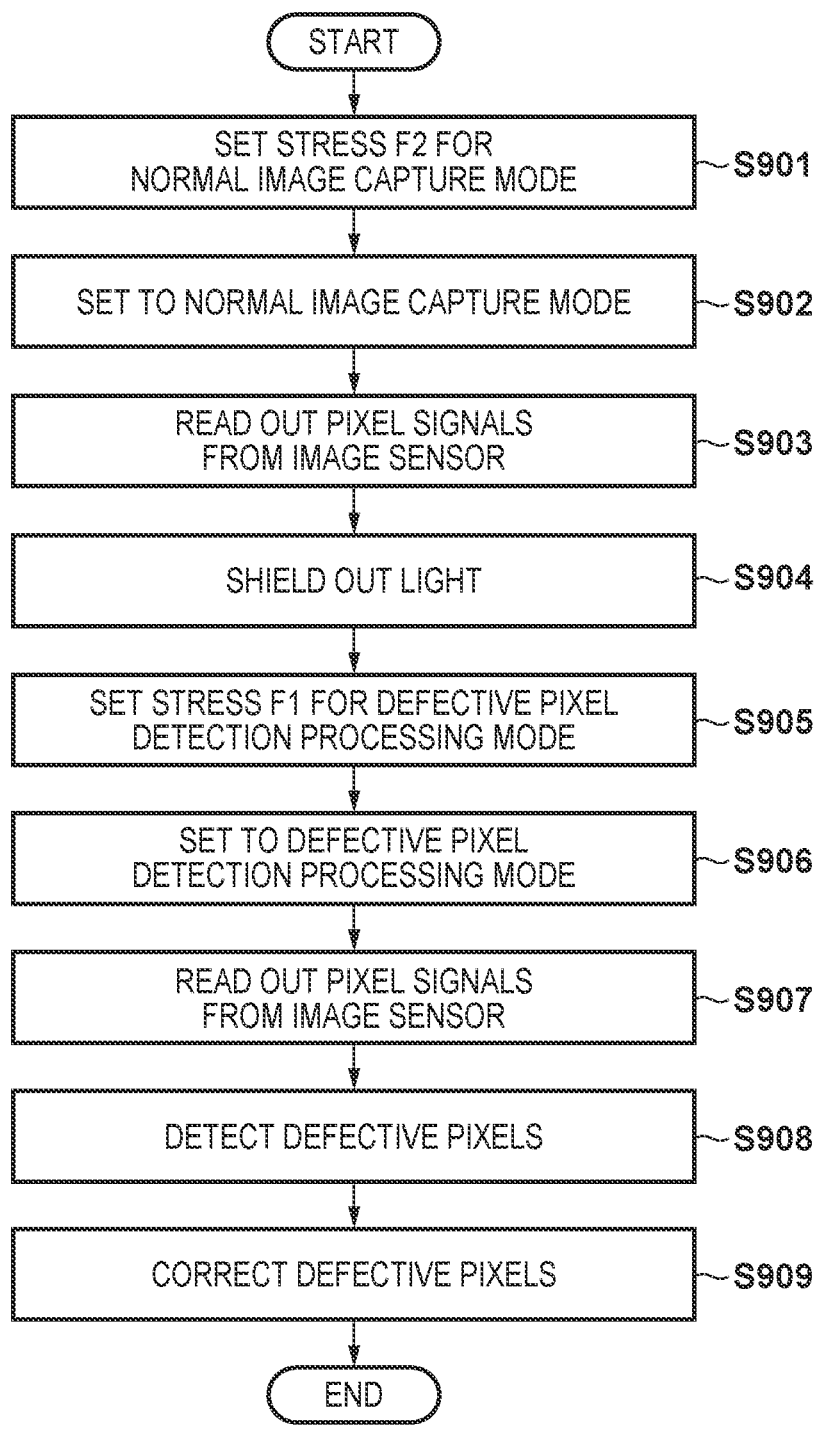

IMAGE CAPTURING APPARATUS

BACKGROUND OF THE INVENTION

Field of the Invention

The present invention relates to an image capturing apparatus.

Description of the Related Art

In image capturing apparatuses such as digital cameras that capture images using solid-state image sensors such as CMOS and CCD image sensors, there are cases where a defective pixel is included in a portion of the pixels on the solid-state image sensor.

A normal pixel without any defects generates an electric signal by being exposed to light and outputs a pixel value that corresponds to the amount of received light. On the other hand, a defective pixel generates an electric signal even without being exposed to light, and thus outputs a pixel value that includes defective elements apart from the amount of received light.

As a measure against such a defective pixel, in Japanese Patent Laid-Open No. 8-18873, correction processing is performed such that the influence of a defective pixel is mitigated by capturing a light-shielded image after capturing a subject image and performing processing for subtracting the light-shielded image from the subject image.

Also, Japanese Patent No. 4604307 proposes an image sensor structured with a curved image capturing surface. In this image sensor, curving the image capturing surface makes it possible to receive light rays from the subject that are incident on the image capturing surface in an approximately orthogonal direction, regardless of the positioning of the image capturing surface.

However, in the above Japanese Patent Laid-Open No. 8-18873, there is a need to increase the charge accumulation time of the light-shielded image in order to increase the defective pixel detection accuracy, and therefore there is a concern that the time lag that occurs when normal image capture is performed will become excessively long.

SUMMARY OF THE INVENTION

The present invention has been made in consideration of the aforementioned problems, and realizes technology that can accurately detect defective pixels in a short period of time.

In order to solve the aforementioned problems, the present invention provides an image capturing apparatus comprising: an image sensor in which a plurality of pixels are arranged two-dimensionally; and a control unit configured to control a band gap of the pixels of the image sensor, wherein the control unit, in a case where defective pixel detection processing is performed on the image sensor, controls the band gap so as to be smaller than in a case where normal image capture is performed.

In order to solve the aforementioned problems, the present invention provides an image capturing apparatus comprising: an image sensor in which a plurality of pixels are arranged two-dimensionally; and a control unit configured to control a curvature of the image sensor, wherein the control unit, in a case where defective pixel detection processing is performed on the image sensor, controls the curvature so as to be smaller than in a case where normal image capture is performed.

In order to solve the aforementioned problems, the present invention provides an image capturing apparatus comprising: an image sensor in which a plurality of pixels are arranged two-dimensionally; and a control unit configured to control a curvature of the image sensor, wherein the control unit, in a case where defective pixel detection processing is performed on the image sensor, controls the curvature such that dark current that is generated on the image sensor is greater than in a case where normal image capture is performed.

According to the present invention, defective pixels can be accurately detected in a short period of time.

Further features of the present invention will become apparent from the following description of exemplary embodiments (with reference to the attached drawings).

BRIEF DESCRIPTION OF THE DRAWINGS

FIG. 5 is a diagram showing a relation between stress generated on the photo diode and dark current according to the present embodiment.

FIG. 7 is a flowchart showing defective pixel detection processing according to the present embodiment.

FIG. 8 is a flowchart showing defective pixel correction processing according to the present embodiment.

FIG. 9 is a flowchart showing defective pixel detection processing and defective pixel correction processing when normal image capture is performed according to a second embodiment.

DESCRIPTION OF THE EMBODIMENTS

Embodiments of the present invention will be described in detail below. The following embodiments are merely examples for practicing the present invention. The embodiments should be properly modified or changed depending on various conditions and the structure of an apparatus to which the present invention is applied. The present invention should not be limited to the following embodiments. Also, parts of the embodiments to be described later may be properly combined.

First Embodiment

An embodiment in which the present invention is applied to image capturing apparatuses such as digital cameras that can capture still images and moving images will be described below. Note that the present invention can also be applied to other apparatuses that have a function of being able to control the band gap of the pixels on the image sensor, that is to say, a function of being able to control dark current that is generated on a pixel-by-pixel basis.

Apparatus Configuration

An outline of the configuration and functions of the image capturing apparatus of an embodiment according to the present invention will be described with reference to FIG. 1.

Figure 1:
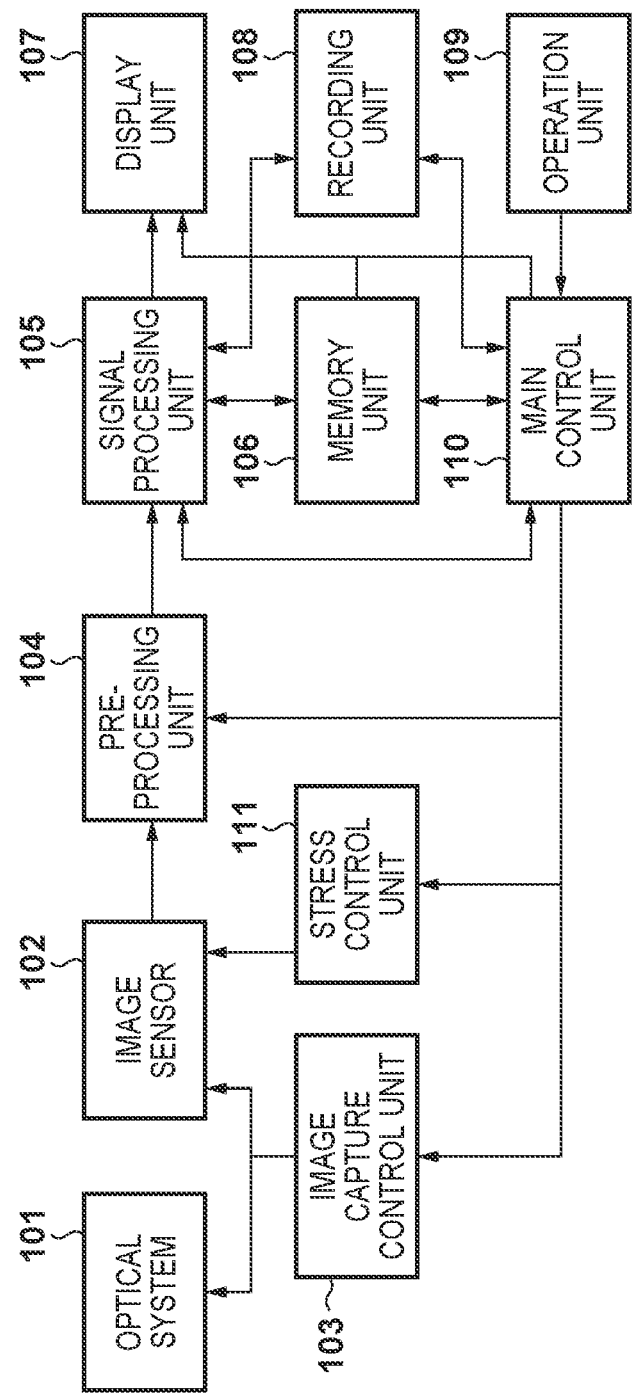
FIG. 1 is a block diagram showing a configuration of an image capturing apparatus according to the present embodiment.

In FIG. 1, the image capturing apparatus of the present embodiment has an optical system 101, an image sensor 102, an image capture control unit 103, a pre-processing unit 104, a signal processing unit 105, a memory unit 106, a display unit 107, a recording unit 108, an operation unit 109, a main control unit 110, and a stress control unit 111.

The optical system 101 includes a focus lens that forms a subject image on the image sensor 102, a zoom lens that performs optical zooming, a diaphragm that adjusts the brightness of the subject image, and a shutter that controls exposure.

The image sensor 102 includes a plurality of pixels arranged two-dimensionally and a circuit that reads out pixel signals from the pixels in a predetermined order.

The image capture control unit 103 operates as per the control signals from the main control unit 110, and drives each element of the optical system 101 and the image sensor 102 by supplying a constant voltage and a pulse that strengthens drive capability. Also, the image capture control unit 103 switches and sets the drive mode of the image sensor 102 between a normal image capture mode (defective pixel correction processing) and a defective pixel detection processing mode, which are to be described later, based on control signals from the main control unit 110.

The pre-processing unit 104 operates as per the control signals from the main control unit 110 and includes a correlative double-sampling circuit (CDS circuit) that removes noise components such as reset noise included in the output signals, which are analog signals, from the image sensor 102, a gain control amplifier that adjusts the amplitude of the output signal from which noise has been removed, and an A/D conversion circuit that converts the output signals, which are analog signals of which the amplitude has been adjusted, into digital signals.

The signal processing unit 105 operates as per the control signals from the main control unit 110 to perform processing including color conversion processing and gamma correction processing on the digital signals output from the pre-processing unit 104, and detection processing and correction processing for defective pixels, and to generate image data by performing compression processing. Also, the signal processing unit 105 outputs image data to the memory unit 106 and the recording unit 108 and performs signal processing on image data read out from the memory unit 106 and the recording unit 108. Furthermore, the signal processing unit 105 has the function of detecting photometric data such as the focus state and exposure amount from the signals from the image sensor 102 and outputting the photometric data to the main control unit 110.

The memory unit 106 temporarily stores digital signals output from the pre-processing unit 104 and image data output from the signal processing unit 105 based on control signals from the main control unit 110. Also, the signal processing unit 105 outputs display image data to the display unit 107.

An electronic view finder (EVF) or a liquid crystal display (LCD), for example, are used as the display unit 107 that displays display image data stored in the memory unit 106 based on control signals from the main control unit 110. The user can determine composition prior to image capture and check the captured image while looking at the image displayed on the display unit 107.

The recording unit 108 records image data output from the signal processing unit 105 and reads out image data already recorded, based on the control signals from the main control unit 110. The recording unit 108 may be a memory card, hard disk drive, or the like that is to be attached to the image capturing apparatus, or it may be a flash memory or a hard disk drive that is built into the image capturing apparatus. The recording unit 108 may also have the same configuration as the memory unit 106 described above.

An operation unit 109 is an operation unit that accepts user operations for inputting various types of instructions to the image capturing apparatus 100, and can be used in various forms including physical operation members such as buttons and switches and as an on-screen input unit via a touch panel. The operation unit 109 includes, for example, a menu switch for making various types of settings when capturing an image and playing back an image, a zoom lever that instructs zoom operation, an operation mode switching switch for switching to modes such as a capture mode and a playback mode, a shutter switch, a power switch, and the like. The main control unit 110 controls the image capturing apparatus and also displays setting information, state of operation, images, and the like on the display unit 107 based on the instructions and settings input by the user via the operation unit 109.

The main control unit 110 has a CPU, a main memory (RAM), an input/output circuit, a timer circuit, and the like, and overall operation of the apparatus is controlled by the CPU expanding programs stored in the memory unit 106 in the work area of the RAM and executing them. Note that the main memory may have the same configuration as the memory unit 106 described above.

The main control unit 110 controls the optical system 101, as per an instruction from the operation unit 109, to form the optimum subject image on the image sensor 102, according to photometric data such as the focus state and the exposure amount obtained by the signal processing unit 105, for example. Also, the main control unit 110 outputs control signals to the stress control unit 111 according to the instructions from the operation unit 109 and predetermined image capturing conditions, and the stress control unit 111 that has received the control signals applies external force to the image sensor 102 to generate a predetermined stress amount. Furthermore, the main control unit 110 can also monitor the state of use of the memory unit 106 and the recording unit 108.

The stress control unit 111 operates as per the control signals from the main control unit 110 and generates the external force to be applied to the image sensor 102 as is explained later.

Operations of the image capturing apparatus of the present embodiment are to be performed as described below.

Display Image Control (1) Power is turned ON as per an instruction from the power switch of the operation unit 109.

(2) The signal processing unit 105 converts output signals from the image sensor 102 into display image data and displays the image data on the display unit 107, and also detects and outputs photometric data to the main control unit 110.

(3) The main control unit 110 controls the optical system 101 based on the photometric data.

The processing of (4), (2), and (3) is repeated while awaiting instruction from the operation unit 109.

Still Image Capture Control (1) Power is turned ON as per an instruction from the power switch of the operation unit 109 and still image capturing control starts.

(2) The signal processing unit 105 detects photometric data from the output signals from the image sensor 102 and outputs the photometric data to the main control unit 110.

(3) The main control unit 110 controls the optical system 101 based on the photometric data.

(4) The image sensor 102 performs exposure and output of signals for recording a still image.

(5) The signal processing unit 105 converts the output signals from the image sensor 102 into recording image data and outputs the recording image data to the recording unit 108 where it is recorded, and converts the recording image data into display image data and displays the display image data on the display unit 107.

(6) The processing returns to display image control.

Image Sensor

Next, the detailed configuration of the image sensor 102 according to the present embodiment will be described with reference to FIG. 2.

Figure 2:
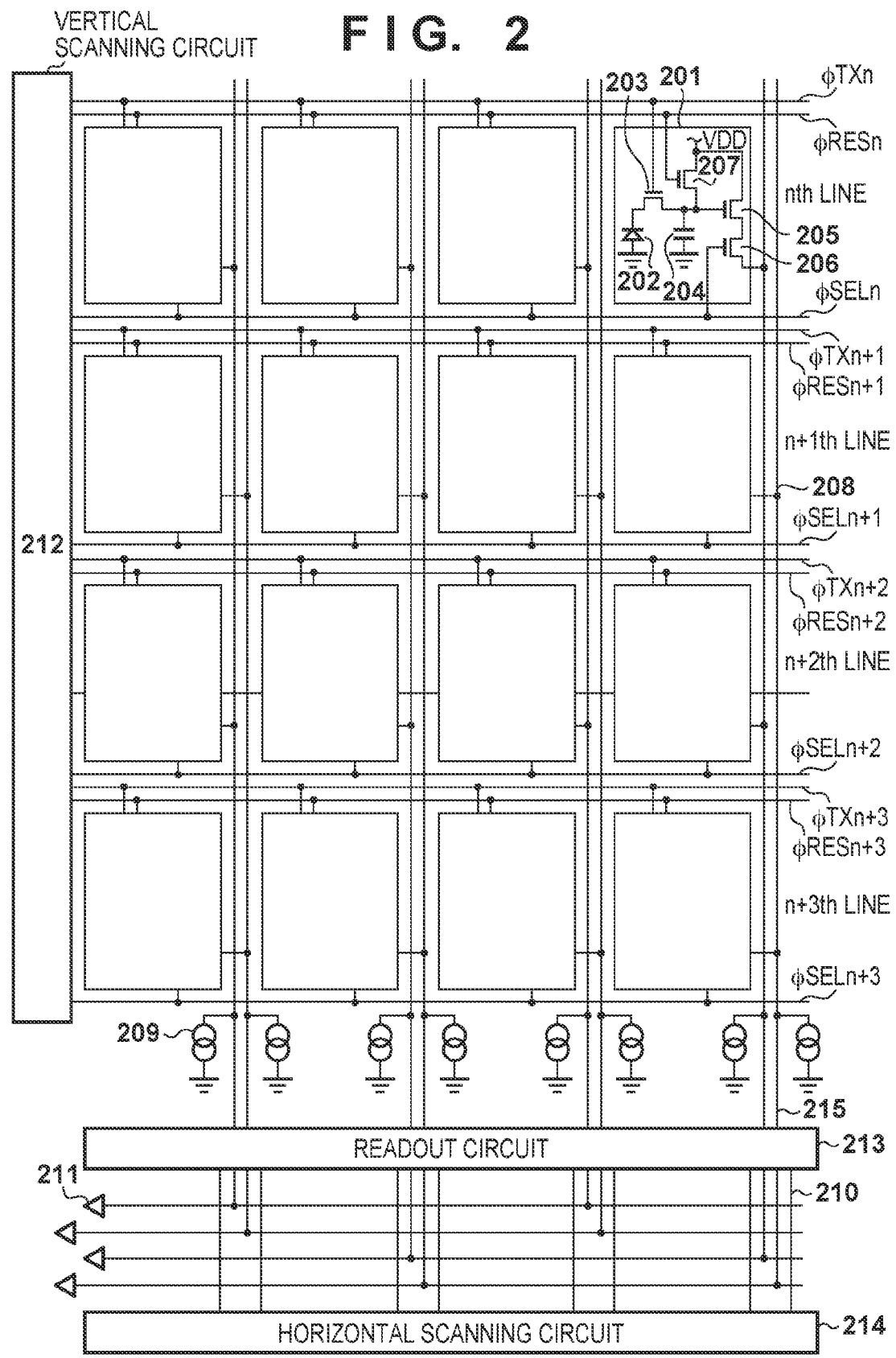
FIG. 2 is a circuit diagram showing an electrical configuration of an image sensor according to the present embodiment.

FIG. 2 is a circuit diagram showing an electrical configuration of the image sensor 102 according to the present embodiment. Note that, in FIG. 2, pixels 201 are shown in an arrangement of only four rows by four columns for ease of description, but in actuality, a plurality of pixels 201 are arranged two-dimensionally.

In FIG. 2, the pixels 201 include a photo diode (PD) 202, a transfer switch 203, a floating diffusion (FD) 204, an amplification MOS amplifier 205 that functions as a source follower, a selection switch 206, and a reset switch 207. Light that is incident on the PD 202 is converted into an electrical charge. The electrical charge generated on the PD 202 is transferred to the FD 204 due to the transfer switch 203 being turned ON, and is temporarily accumulated in the FD 204. A floating diffusion amplifier is configured by the FD 204, the amplification MOS amplifier 205, and a constant current source 209 that is the load of the amplification MOS amplifier 205, and by turning ON the selection switch 206, the signal charge of the selected pixel is converted into a voltage that is output to a readout circuit 213 via a signal output line 208. Furthermore, an output signal is selected by a selection unit 210 driven by a horizontal scanning circuit 214, and a pixel signal is output via an output amplifier 211. The electrical charge accumulated in the FD 204 is removed by the reset switch 207 being turned ON. Also, a vertical scanning circuit 212 outputs a transfer signal φTX, a selection signal φSEL, and a reset signal φRES for respectively turning ON/OFF the transfer switch 203, the selection switch 206, and the reset switch 207.

Relation Between Defective Pixel and Dark Current

The relation between a defective pixel and dark current will be described with reference to FIG. 3 and FIGS. 4A and 4B.

The difference between a defective pixel and a normal pixel without any defects is that the amount of dark current that is generated in the pixel differs.

Compared to a normal pixel, the amount of dark current generated in a pixel is greater in a defective pixel, and also the generated dark current is converted into a pixel signal along with the photoelectrically converted subject image, and therefore a pixel signal value that includes a noise signal due to dark current in the subject image is output.

Figure 3:
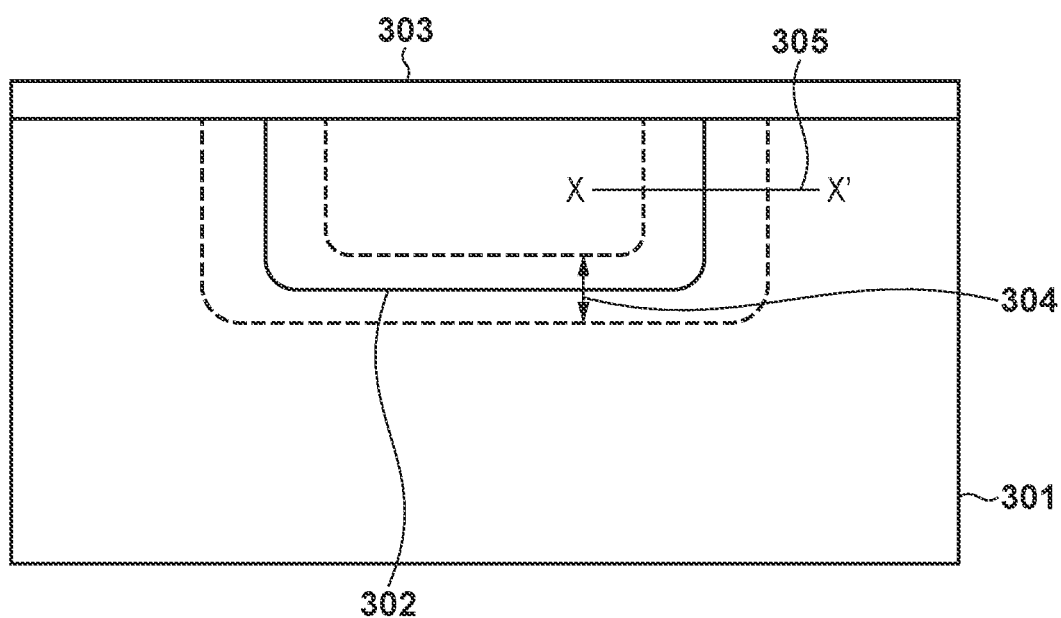
FIG. 3 is a cross-sectional diagram of a photo diode of the image sensor according to the present embodiment.

There are many factors involved in the generation of dark current, but the main locations where dark current is generated are shown in FIG. 3. FIG. 3 is a cross-sectional diagram of the photo diode (PD) 202.

In FIG. 3, a p-substrate 301 is formed from a p-type semiconductor that will form the substrate of the image sensor 102. The p-type semiconductor is described here as being p-type silicon.

An n-type semiconductor region 302 is a region formed by adding an n-type impurity atoms to the p-substrate 301.

An oxide film 303 is a protective film for protecting the surface of the PD 202.

A depletion layer 304 is a region that is generated between the p-substrate 301 and the n-type semiconductor region 302, and in which there is no movable electrical charge.

A region 305 where dark current is likely to be generated is the region on the boundary between the p-substrate 301 and the n-type semiconductor region 302 where the crystal structure is disordered and electrons are easily trapped.

Next, the principles of dark current generation will be described.

Figure 4A:
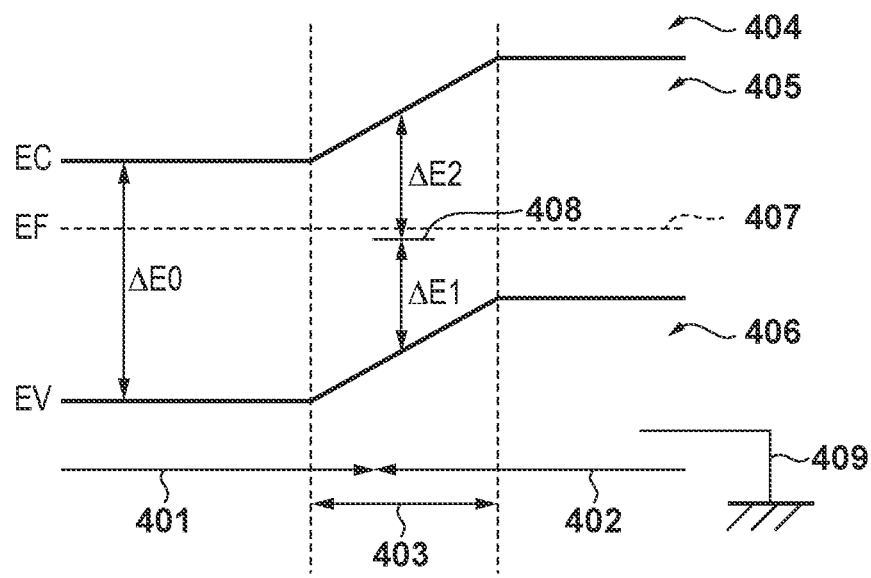
FIGS. 4A and 4B are diagrams illustrating an energy band according to the present embodiment.

FIG. 4A shows an X-X' energy band of the region 305 where dark current is likely to be generated due to crystal defects.

In FIG. 4A, an n-type semiconductor region 401 indicates the n-type semiconductor region 302 shown in FIG. 3. A p-substrate 402 indicates the p-substrate 301 shown in FIG. 3. A depletion layer 403 indicates the depletion layer 304 shown in FIG. 3. A conduction band 404 is a region in which electrons can freely move. Note that electrons generated in the conduction band 404 are stored in the n-type semiconductor region 401. A band gap 405 is a region with no electrons. A valence band 406 is a region full of electrons where the electrons cannot move freely. A level 407 is a Fermi level. A level 408 is an energy level that exists in the band gap 405 of the depletion layer 403 and is caused by crystal defects. A ground 409 is connected to the p-substrate.

$\Delta E0$ indicates the width of the band gap 405. $\Delta E1$ indicates the energy required by electrons to move from the valence band 406 to the energy level 408 caused by crystal defects. $\Delta E2$ indicates the energy required by electrons to move from the energy level 408 caused by crystal defects to the conduction band 404.

Dark current is generated because the energy level 408 caused by crystal defects exists. Specifically, electrons are released from the valence band 406 to the conduction band 404 via the energy level 408 caused by crystal defects in the depletion layer 403. Electrons released from the conduction band 404 at this time become dark current.

Electrons released to the conduction band 404 move from the depletion layer 403 to the n-type semiconductor region 401 where they accumulate. On the other hand, holes generated in the valence band 406 due to electron movement move to the p-substrate 402 and flow to the ground 409.

FIG. 4A illustrates that dark current is generated because the energy level 408 caused by crystal defects exists. However, it can be understood that less dark current will be generated in the case where the band gap is wide, even if an energy level 418 caused by crystal defects exists, as shown in FIG. 4B.

Figure 4B:
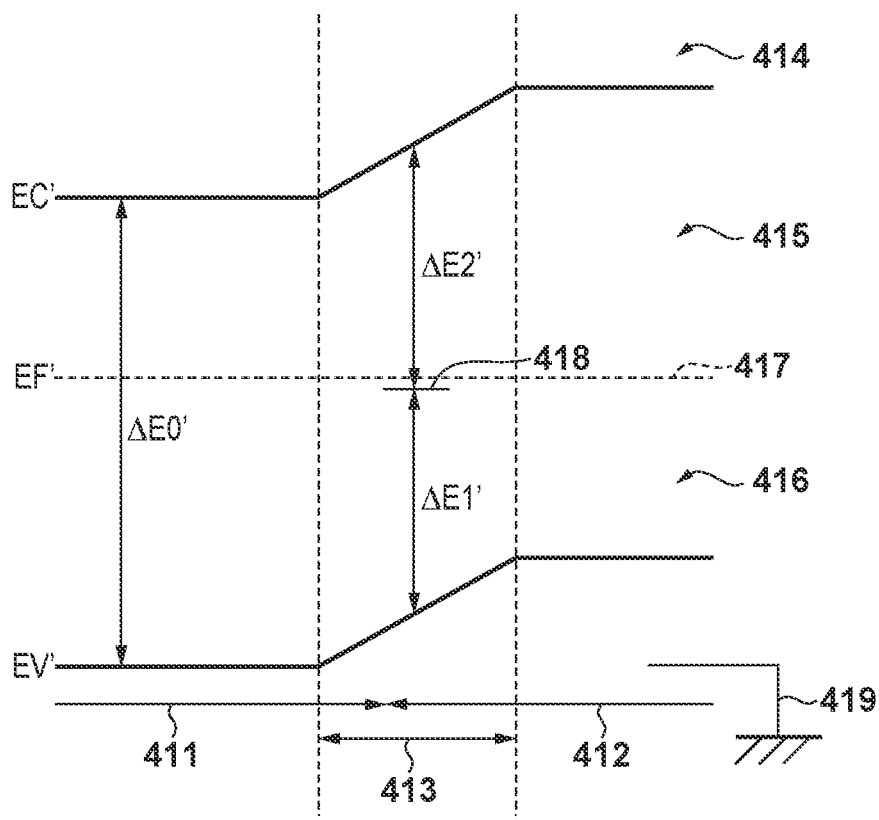

FIG. 4B has the same configuration as FIG. 4A and shows the case where the band gap is wide.

In FIG. 4B, an n-type semiconductor region 411 indicates the n-type semiconductor region 302 shown in FIG. 3. A p-substrate 412 indicates the p-substrate 301 shown in FIG. 3. A depletion layer 413 indicates the depletion layer 304 shown in FIG. 3. A conduction band 414 is a region in which electrons can freely move. Electrons generated in the conduction band 414 accumulate in the n-type semiconductor region 411. A band gap 415 is a region with no electrons. A valence band 416 is a region full of electrons in which the electrons cannot freely move. A level 417 is a Fermi level. A level 418 is an energy level that exists in the band gap 415 of the depletion layer 403 and is caused by crystal defects. A ground 419 is connected to the p-substrate. $\Delta E0'$ indicates the width of the band gap 415. $\Delta E1'$ indicates the energy required by electrons to move from the valence band 416 to the energy level 418 caused by crystal defects. $\Delta E2'$ indicates the energy required by electrons to move from the energy level 418 caused by crystal defects to the conduction band 414.

The following formulas 1 to 3 are realized in the case where FIG. 4A and FIG. 4B are compared.

$$\Delta E0' > \Delta E0 \quad (1)$$

$$\Delta E1' > \Delta E1 \quad (2)$$

$$\Delta E2' > \Delta E2 \quad (3)$$

As is shown with the formulas 1 to 3, by increasing the band gap width of the band gap 405 shown in FIG. 4A to that of the band gap 415 shown in FIG. 4B, energies $\Delta E1$ and $\Delta E2$ required by electrons to move from the valence band to the conduction band increase to $\Delta E1'$ and $\Delta E2'$.

Next, a method for suppressing dark current generation will be described.

FIG. 4A was used to illustrate that dark current is due to the movement of electrons from the valence band 406 to the conduction band 404 via the energy level 408 caused by crystal defects.

Also, FIG. 4B was used to illustrate that it becomes difficult for electrons to move from the valence band 406 to the conduction band 404 via the energy level 408.

In other words, if the width of the band gap 405 can be controlled, the amount of dark current can be controlled.

Controlling the stress generated on the PD 202 by controlling the external force applied to the PD 202 is suggested as one method of controlling the width of this band gap 405.

The amount of dark current changes as a result of the width of the band gap changing according to the magnitude of stress generated on the PD 202.

FIG. 5 shows the relation between the stress generated on the PD 202 and the amount of dark current, the horizontal axis indicating the force applied to the image sensor, and the vertical axis indicating the amount of dark current generated in the PD 202 with a logarithmic axis.

For example, the dark current on the PD 202 is N1 when external force is applied to the PD 202 and stress F1 is generated.

Also, the dark current on the PD 202 is N2 when another force is applied to the PD 202 and stress F2 is generated.

According to FIG. 5, the relation between the stress generated on the PD 202 and the amount of dark current is expressed with formulas 4 and 5 described below.

$$F1 < F2 \quad (4)$$

$$N1 > N2 \quad (5)$$

As a result, it can be understood that dark current decreases as the stress generated on the PD 202 increases.

Stress Control Unit

Next, the configuration of the stress control unit 111 that applies external force to the image sensor 102 will be described with reference to FIGS. 6A and 6B.

Methods of applying external force to the image sensor 102 include methods utilizing magnetic force, temperature, or negative pressure. Thus, in controlling the band gap of the present embodiment, a method is described in which external force is applied to the image sensor 102 in a pulling direction using negative pressure.

Note that the method of controlling the band gap of the image sensor 102 is not limited to this example, and may be realized with another method.

Figure 6A:
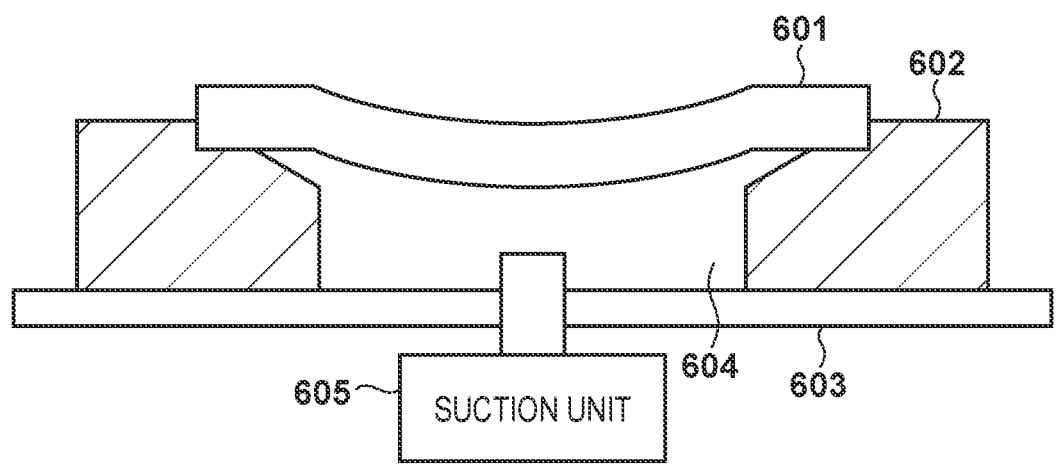
FIGS. 6A and 6B are diagrams showing a configuration of a stress control unit according to the present embodiment.
Figure 6B:
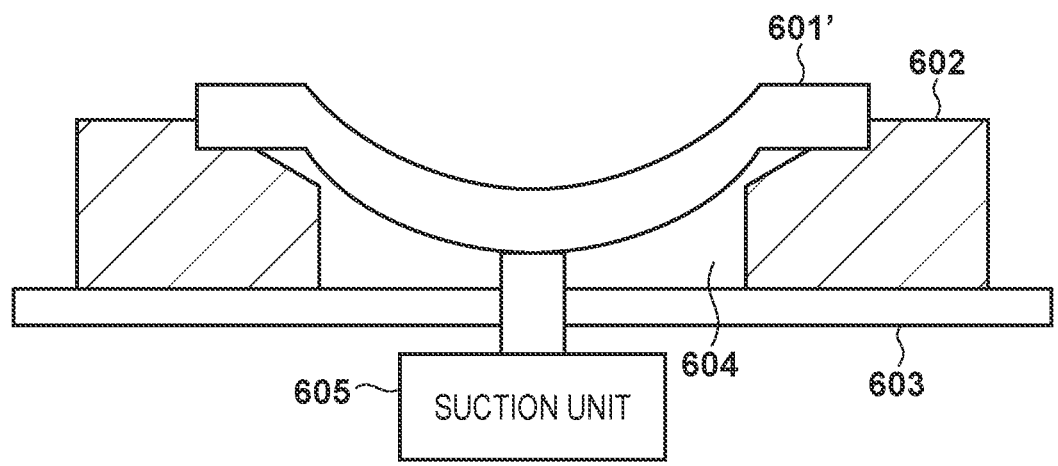

FIGS. 6A and 6B show the configuration of a stress control mechanism that applies external force to the image sensor 102, with FIG. 6A showing a state in which no force is applied and FIG. 6B showing a state in which force is applied.

In FIG. 6A, an image sensor 601 is a semiconductor substrate that has an image capturing region where a plurality of pixels 201 are arranged two-dimensionally in the middle portion and circuit units 209 to 215 shown in FIG. 2 in the peripheral portion. A holding unit 602 holds the image sensor 601 curved to a first curvature. A lid portion 603 is connected to the holding unit 602. A space portion 604 is a closed space filled with air or liquid and is surrounded by the image sensor 601, the holding unit 602, the lid portion 603, and a suction unit 605.

The suction unit 605 can discharge a medium from the space portion 604 and conversely introduce a medium. In other words, the medium in the space portion 604 is either introduced or externally discharged via the suction unit 605.

The external force to be applied to the image sensor 601 can be controlled by controlling the amount of the medium introduced to and discharged from the space portion 604 to change the pressure in the space portion 604.

At this time, the stress F1 is generated on the pixel unit of the image sensor 601 shown in FIG. 6A, and thus a defective pixel detection state is achieved. In this state, the medium in the space portion 604 is sucked and discharged by the suction unit 605, and FIG. 6B shows the state in which stress has been generated on the image sensor 601.

In FIG. 6B, the image sensor 601 deforms like an image sensor 601' due to force applied to the image sensor 601 in a downward direction, and the image sensor 601 takes on a state in which it is curved to a second curvature that is larger than the first curvature.

At this time, the stress F2 is generated on the pixel unit of the image sensor 601' shown in FIG. 6B, which is the state during the normal image capture mode for capturing a normal image.

Note that, as illustrated in FIG. 5, dark current decreases when the stress generated on the image sensor increases, and therefore there is less dark current on the image sensor in the state of the image sensor 601' compared to the state of the image sensor 601.

Defective Pixel Detection and Correction Processing

Defective pixel detection processing and defective pixel correction processing according to the present embodiment will be described below with reference to FIG. 7 and FIG. 8.

Note that the processing shown in FIG. 7 and FIG. 8 is realized by the main control unit 110 and the stress control unit 111 cooperating and the CPU of the main control unit 110 expanding programs read out from the memory unit 106 in the main memory and executing the programs. The same applies to the later-described processing for the second embodiment shown in FIG. 9.

In the present embodiment, defective pixel detection processing is performed prior to defective pixel correction processing being performed during the normal image capture mode, and defective pixel correction processing is performed using the defective pixel detection results. Specifically, in the defective pixel detection processing, the main control unit 110 controls the stress control unit 111 to curve or bend the image sensor 102 to the first curvature by applying external force such that the stress F1 in FIG. 5 is generated. Also, in the defective pixel correction processing during the normal image capture mode, the image sensor 102 is curved to the second curvature by applying external force such that the stress F2 in FIG. 5 is generated. Specifically, the first curvature during the defective pixel detection mode is controlled such to be smaller than the second curvature during the normal image capture mode. As a result, the dark current during the defective pixel detection processing mode will be N1, and the dark current during the normal image capture mode will be N2. This means that, the dark current N2 during the normal image capture mode for capturing a normal image is smaller than the dark current N1 during the defective pixel detection processing mode; in other words, there is more dark current during the defective pixel detection processing mode than during the normal image capture mode, and thus the defective pixel detection accuracy increases.

FIG. 7 is a flowchart showing defective pixel detection processing according to the present embodiment.

In step S701, the main control unit 110 controls the suction unit 605 of the stress control unit 111 to curve the image sensor 102 to the first curvature by applying external force and generate the stress F1, which occurs during the defective pixel detection processing, on the PD 202.

In step S702, the main control unit 110 controls the image capture control unit 103 to set the drive mode of the image sensor 102 to the defective pixel detection processing mode. Here, the main control unit 110 sets the image capturing conditions for capturing a light-shielded image. The longer the charge accumulation time of the image sensor 102 the more the defective pixel detection accuracy can be increased, but if defective pixels can be sufficiently detected, the charge accumulation time may be shortened with the intent of shortening the image capturing time lag.

In step S703, the main control unit 110 controls the image capture control unit 103 to read out pixel signals from the image sensor 102.

In step S704, the main control unit 110 controls the signal processing unit 105 to detect defective pixels from the pixel signals (digital signals processed by the pre-processing unit 104) read out from the image sensor 102 and record the detection results. Defective pixel detection is performed by applying filter processing to pixel signals read out from the image sensor 102 to separate the pixel signals from the noise signals caused by dark current, and comparing the noise signal level that corresponds to the amount of dark current in the defective pixel with a threshold value. Then, the coordinate information regarding the detected defective pixel is recorded in the memory unit 106, and the defective pixel correction processing is utilized during the normal image capture mode for capturing a normal image.

FIG. 8 is a flowchart showing defective pixel correction processing during the normal image capture mode according to the present embodiment.

In step S801, the main control unit 110 controls the suction unit 605 of the stress control unit 111 to curve the image sensor 102 to the second curvature by applying external force, and generate the stress F2 that occurs during the normal image capture mode on the PD 202. Accordingly, in step S801, the dark current generated on the defective pixels of the image sensor 102 decreases compared to the dark current during the defective pixel detection processing mode in FIG. 7 because the band gap of the PD 202 is wider than it is in step S701.

In step S802, the main control unit 110 controls the image capture control unit 103 to set the readout mode of the image sensor 102 to the normal image capture mode. Here, the main control unit 110 sets the exposure conditions for capturing a subject image.

In step S803, the main control unit 110 controls the image capture control unit 103 to read out pixel signals from the image sensor 102.

In step S804, the main control unit 110 corrects the defective pixels of the pixel signals read out from the image sensor 102 based on the coordinate information regarding the defective pixels detected and recorded in step S704.

As described above, according to the present embodiment, defective pixels can be accurately detected in a short period of time.

Second Embodiment

Next, the second embodiment will be described.

Most defective pixels in the image sensor 102 can be detected with the defective pixel detection processing described above for the first embodiment.

However, when unique image capturing conditions such as long accumulation time and high temperature conditions are included, all of the defective pixels in a captured image cannot necessarily be detected by the defective pixel detection processing of the first embodiment. Also, there are cases of defective pixels being generated after defective pixel detection of the first embodiment due to external factors.

In regards to such an issue, conventionally a light-shielded image is captured immediately after capturing a normal image and defective pixels are detected from the obtained light-shielded image, and the defective pixels of the subject image are corrected.

However, there is a need to increase the charge accumulation time of the light-shielded image in order to increase the defective pixel detection accuracy, also the light-shielded image and the subject image need to have the same charge accumulation time, and therefore there is a concern that the time lag at the time of normal image capture will become excessively long.

In the present embodiment, capturing a subject image is possible without the time lag at the time of normal image capture becoming excessively long by switching to the defective pixel detection processing mode after a normal image is captured, and capturing a light-shielded image, and performing defective pixel detection processing.

FIG. 9 is a flowchart showing defective pixel detection and correction processing during image capturing according to the second embodiment.

Similar to step S801 in FIG. 8, in step S901, the main control unit 110 controls the suction unit 605 of the stress control unit 111 to curve the image sensor 102 to the second curvature by applying external force, and generate the stress F2 that occurs during normal image capture mode on the PD 202. Accordingly, the amount of dark current generated in each pixel of the image sensor 102 decreases because the band gap of the PD 202 is wider than it is during the defective pixel detection processing mode in step S905, and the influence of noise caused by dark current can be mitigated.

Similar to step S802, in step S902, the main control unit 110 controls the image capture control unit 103 to set the readout mode of the image sensor 102 to be the normal image capture mode.

Similar to step S803, in step S903, the main control unit 110 controls the image capture control unit 103 to read out pixel signals from the image sensor 102.

In step S904, the main control unit 110 controls the image capture control unit 103 to shield the image sensor 102 by closing the mechanical shutter included in the optical system 101.

Next, similar to step S701 in FIG. 7, in step S905, the main control unit 110 controls the suction unit 605 of the stress control unit 111 to curve the image sensor 102 to the first curvature by applying external force and generate the stress F1, which occurs during the defective pixel detection processing mode, on the PD 202. Accordingly, the band gap of the PD 202 is narrower than it is during the normal image capture mode in step S901. As a result, more dark current is generated in the defective pixels of the image sensor 102 than is generated during the normal image capture mode in step S901, and the defective pixels can be accurately detected because the signal value of the defective pixels is a value higher than that during the normal image capture mode.

Similar to step S702, in step S906, the main control unit 110 controls the image capture control unit 103 to set the drive mode of the image sensor 102 to be the defective pixel detection processing mode. Here, defective pixel detection accuracy can be further increased by setting a long charge accumulation time. Also, in order to shorten the time lag at the time of image capturing, the accumulation time may be shortened to a range in which a certain degree of detection accuracy can be maintained.

Similar to step S703, in step S907, the main control unit 110 controls the image capture control unit 103 to read out pixel signals from the image sensor 102.

Similar to step S704, in step S908, the main control unit 110 detects defective pixels from the pixel signals of the light-shielded image read out from the image sensor 102 in step S907.

Similar to step S804, in step S909, the main control unit 110 corrects the defective pixels of the pixel signals of the subject image read out from the image sensor 102 in step S903 based on the coordinate information regarding the defective pixels detected in step S908.

As described above, according to the second embodiment, in addition to the effects of the first embodiment, defective pixel detection processing in which the time lag at the time of image capturing does not become excessively long can be realized.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-021491, filed Feb. 5, 2015 which is hereby incorporated by reference herein in its entirety.

What is claimed is:

1. An image capturing apparatus comprising:
   an image sensor in which a plurality of pixels are arranged two-dimensionally; and
   at least one processor; and
   a memory storing instructions which cause the at least one processor to perform operations of a control unit, wherein:
   the control unit is configured to control a band gap of the pixels of the image sensor, and
   wherein the control unit, in a case where defective pixel detection processing is performed on the image sensor, controls the band gap so as to be smaller than in a case where normal image capture is performed.

2. The apparatus according to claim 1, wherein the apparatus is
   configured to apply external force to the image sensor, and
   wherein the control unit controls the band gap by controlling to generate stress on each pixel of the image sensor.

3. The apparatus according to claim 1, wherein the defective pixel detection processing is performed based on dark current that is generated in the pixels of the image sensor.

4. The apparatus according to claim 1, wherein the control unit, in the case where normal image capture is performed, performs processing to correct defective pixels detected by the defective pixel detection processing.

5. The apparatus according to claim 4, wherein the defective pixel detection processing is performed prior to the normal image capture.

6. The apparatus according to claim 1, wherein the control unit captures a light-shielded image in a state in which the image sensor is shielded and performs defective pixel detection processing on a captured image using the light-shielded image.

7. The apparatus according to claim 1, a charge accumulation time of the image sensor in the case where the defective pixel detection processing is performed is set to be longer than in the case where normal image capture is performed.

8. An image capturing apparatus comprising:
   an image sensor in which a plurality of pixels are arranged two-dimensionally; and
   at least one processor; and
   a memory storing instructions which cause the at least one processor to perform operations of a control unit, wherein:
   the control unit is configured to control a curvature of the image sensor,
   wherein the control unit, in a case where defective pixel detection processing is performed on the image sensor, controls the curvature so as to be smaller than in a case where normal image capture is performed.

9. The apparatus according to claim 8, wherein the defective pixel detection processing is performed based on dark current that is generated in the pixels of the image sensor.

10. The apparatus according to claim 8, wherein the control unit, in the case where normal image capture is performed, performs processing to correct defective pixels detected by the defective pixel detection processing.

11. The apparatus according to claim 10, wherein the defective pixel detection processing is performed prior to the normal image capture.

12. The apparatus according to claim 8, wherein the control unit captures a light-shielded image in a state in which the image sensor is shielded and performs defective pixel detection processing on a captured image using the light-shielded image.

13. The apparatus according to claim 8, wherein a charge accumulation time of the image sensor in a case where the defective pixel detection processing is performed is set to be longer than it is in the case where normal image capture is performed.

14. An image capturing apparatus comprising:
an image sensor in which a plurality of pixels are arranged two-dimensionally; and
at least one processor; and
a memory storing instructions which cause the at least one processor to perform operations of a control unit, wherein:
the control unit is configured to control a curvature of the image sensor,
wherein the control unit, in a case where defective pixel detection processing is performed on the image sensor, controls the curvature such that dark current that is generated on the image sensor is greater than in a case where normal image capture is performed.

15. The apparatus according to claim 14, wherein the defective pixel detection processing is performed based on the dark current that is generated in the pixels of the image sensor.

16. The apparatus according to claim 14, wherein the control unit, in the case where normal image capture is performed, performs processing to correct defective pixels detected by the defective pixel detection processing.

17. The apparatus according to claim 16, wherein the defective pixel detection processing is performed prior to the normal image capture.

18. The apparatus according to claim 14, wherein the control unit captures a light-shielded image in a state in which the image sensor is shielded and performs defective pixel detection processing on a captured image using the light-shielded image.

19. The apparatus according to claim 14, wherein a charge accumulation time of the image sensor in a case where the defective pixel detection processing is performed is set to be longer than in the case where normal image capture is performed.

* * * * *